(12) United States Patent
Henrion (10) Patent No.: US 7,184,436 B2
(45) Date of Patent: Feb. 27, 2007

(54) METHOD AND A SYSTEM FOR CONTROLLING SERVICE TIMES OF COPIED MULTICAST CELLS IN A SWITCHING NETWORK OF AN ASYNCHRONOUS SWITCHING NODE

(75) Inventor: Michel Henrion, Boulogne-Billancourt (FR)

(73) Assignee: Alcatel, Paris (FR)

( * ) Notice: Subject to any disclaimer, the term of this patent is extended or adjusted under 35 U.S.C. 154(b) by 1052 days.

(21) Appl. No.: 10/270,533

(22) Filed: Oct. 16, 2002

(65) Prior Publication Data

US 2003/0076827 A1 Apr. 24, 2003

(30) Foreign Application Priority Data

Oct. 18, 2001 (FR) .................................. 01 13438

(51) Int. Cl.
*H04L 12/56* (2006.01)
*H04J 3/24* (2006.01)

(52) U.S. Cl. ...................... 370/390; 370/312; 370/432

(58) Field of Classification Search ................ 370/312, 370/349, 390–394, 473–475, 432, 229–239, 370/412–419, 395.4, 498
See application file for complete search history.

(56) References Cited

U.S. PATENT DOCUMENTS 5,923,644 A * 7/1999 McKeown et al. ......... 370/230
6,212,182 B1 * 4/2001 McKeown ................... 370/390
6,349,089 B1 * 2/2002 Bonomi et al. .......... 370/230.1
7,023,840 B2 * 4/2006 Golla et al. ................. 370/360
2002/0136230 A1 * 9/2002 Dell et al. ................... 370/416

OTHER PUBLICATIONS

Chen W-T et al: "An Efficient Cell-Scheduling Algorithm for Multicast ATM Switching Systems" IEEE/ACM Transactions on Networking, IEEE Inc. New York, US, vol. 8, No. 4, Aug. 2000, pp. 517-525, XP000959123.
Chen F et al: "A Large Scale Multicast ATM Switch with Input and Output Link Sharing" 1999 IEEE Global Telecommunications Conference. Globecom '99.Seamless Interconnection for Universal Services Rio De Janeiro, Brazil, Dec. 5-9, 1999, IEEE Global Telecommunications Conference, New York, NY: IEEE, US, vol. 2, Dec. 5, 1999, pp. 1251-1255, XP001016911.

* cited by examiner

*Primary Examiner*—Chi Pham
*Assistant Examiner*—Tri H. Phan
(74) *Attorney, Agent, or Firm*—Sughrue Mion, PLLC (57) ABSTRACT

The invention relates to a method of controlling the service time of unicast cells and multicast cells in input modules of an asynchronous switching node which comprises n1 input modules and n2 output modules. The multicast cell are copied in the network between the input and the output modules. The service time (SDTm) of a multicast cell is controlled in the input module in such a way that the time is chosen in a reference queue (Qr) and is close to that time in the other queues (Qs, Qt).

10 Claims, 5 Drawing Sheets

METHOD AND A SYSTEM FOR CONTROLLING SERVICE TIMES OF COPIED MULTICAST CELLS IN A SWITCHING NETWORK OF AN ASYNCHRONOUS SWITCHING NODE

The invention relates to a method and a system for switching external data blocks received over transmission lines of an asynchronous communications node in a telecommunications system.

The expression "external data blocks" covers both packets of variable length and cells of fixed length.

BACKGROUND OF THE INVENTION

A switching node considered in the context of the present description comprises $n1$ input terminal modules and $n2$ output terminal modules, interconnected by an asynchronous cell switching network. In the remainder of the present description the input and output terminal modules are simply referred to as "input modules" and "output modules", respectively.

In the switching node, an external data block received at an incoming port of an input module must be switched either to an outgoing port of a given output module, in which case it is called a unicast data block, or to outgoing ports of a plurality of output modules, in which case it is called a multicast data block.

If the external data blocks are received in the form of variable length packets they are converted into internal format cells in the input modules using techniques in the art. When they have been transferred to the destination output modules via the switching network, the internal format cells are converted back into external data blocks, cells or packets.

Within the switching node, the asynchronous switching network switches internal format cells, regardless of the external data block type, each cell being transferred from an incoming module to at least one destination outgoing module. In the input modules of the node, there are therefore two types of cells to be transferred across the switching network: a first type of cell, called a unicast cell, which must be routed to a given single destination output module, and a second type of cell, called a multicast cell, which must be routed to $N$ given destination output modules of the $n2$ output modules of the node.

There are two prior art methods of converting a multicast cell into $N$ cells to be delivered to the $N$ respective destination output modules:

The first method consists in generating $N$ copies of a multicast cell in the input module so that it then sends $N$ unicast cells to the switching network, each cell being addressed to one of the $N$ destination output modules required for that multicast cell.

In the second method, to which the invention relates, the input module sends a single example of the multicast cell to the switching network, and it is the network which generates $N$ copied cells from the multicast cell and routes each of the $N$ copied cells to the $N$ respective destination output modules required for the multicast cell.

In the switching node, the streams of cells transferred across the switching network can cause congestion in the network whenever the overall bit rate of the cell traffic supplied to a given output module and coming from different input modules becomes excessive relative to the bandwidth authorized for access to the output module.

The conventional way to prevent such congestion in the switching network is for each input module to regulate the bit rates at which cells are transferred to each output module of the node so that the overall bit rate of the cell traffic supplied to each output module is not excessive.

To this end, each input module is provided with buffer memories for temporarily storing cells, and the buffer memories are structured in the form of queues, each of which corresponds to a given output module.

That prior art technique is well suited to regulating multicast cell traffic bit rate when multicast cells are sent to only one output module. However, that technique is not the optimum for regulating multicast cell traffic bit rate, since it provides a respective managed queue structure for each stream of outgoing cells comprising multicast cells supplied by the switching network to a given output module, whereas a single multicast cell is to be sent to $N$ destination output modules. Furthermore, given that each multicast cell transmitted to the switching network by an input module generates within the network $N$ cells supplied to the $N$ destination output modules, the service bit rate of those cells should be regulated so that due account is taken of their respective contribution to each overall bit rate of cell traffic supplied to the $N$ respective output modules, so that none of those overall bit rates is excessive. In theory, generalizing a principle of this kind to multicast cells would make it necessary to introduce a new dimension corresponding to the number of different subsets of $N$ destination output modules selected from the $n2$ output modules of the node. This would quickly lead to excessive complexity once the number $n2$ of output modules were no longer small, as this would imply a large number of combinations of subsets of $N$ from $n2$ output modules.

OBJECTS AND SUMMARY OF THE INVENTION

To eliminate this drawback in relation to the regulation of multicast cell bit rates, the invention relates to a method and to a system for use in the input modules of the asynchronous switching node to control the service times of unicast and multicast cells in the queues relating to each of the streams of outgoing cells corresponding to the subset of cells supplied by the switching network to each given output module, which method also ensures that the overall bit rate of the traffic comprising all of the cells supplied to each output module is not excessive.

The invention consists in a method of controlling the service time of unicast cells and multicast cell in input modules of an asynchronous switching node which comprises $n1$ input modules and $n2$ output modules interconnected by a cell switching network that transfers each cell from an input module to at least one output module. A unicast cell is routed to a single given destination output module and a multicast cell is routed to $N$ given destination output modules of the $n2$ output modules of the node via said switching network which itself generates $N$ cells copied from a multicast cell. Each input module is provided with buffer memories for temporarily storing cells, the service time of a cell in a buffer memory triggering its transfer from the input module to at least one output module via the switching network. The service times of all of the unicast and multicast cells are controlled in each input module in queues relative to each output module.

According to one feature of the invention the service time of a multicast cell is controlled in a manner that takes account of the fact that the switching network itself generates, from each multicast cell to be transferred to N destination output modules, N copied cells that it delivers to the N respective output modules, considering, in each input module, the departure of a multicast cell to the switching network as being equivalent to the simultaneous departure of N virtual unicast cells to the N destination output modules, the N virtual unicast cells corresponding to the N cells generated by the switching network and supplied to the output modules. Furthermore, firstly, the service time of the virtual departure of one of said N virtual unicast cells corresponds to the service time, referred to as the multicast service time, of the real departure of that multicast cell from a selected queue relating to one of the N destination output modules, and, secondly, the service time of the virtual departure of each of said N−1 other virtual unicast cells concerned is only simulated, in each of the N−1 queues concerned relating to the N−1 respective other destination output modules concerned, as a virtual service time that is effected at the same instant as that of said multicast service time. Then, in an input module, the service times of the unicast and multicast cells are controlled in each queue relating to an output module so that, for all of the cells relating to that output module, referred to as the set of unicast cells, which comprises, firstly, the real unicast cells and, secondly, the virtual unicast cells corresponding to multicast cells having this output module from its N destination output modules, the respective service times of these cells being separated by a time interval at least equal to the service time interval required between two successive cells of the outgoing stream of cells supplied by the switching network to that output module, so that, for each outgoing stream of cells supplied to a given output module, the predetermined cell bit rate that is allocated to the corresponding queue is not exceeded.

In other words, in the queues of an input module relating to each of the streams of outgoing cells supplied to a given output module, the service times of the queues are used not only to trigger the transfer of multicast cells in the conventional way to a single destination output module, but also to trigger the transfer of multicast cells to N destination output modules. Since each multicast cell sent to the switching network by an input module generates within the network N cells to be supplied to the N destination output modules, in terms of switching network output traffic, the departure of any such cell is equivalent to the simultaneous departure of N multicast cells to the N respective output modules, and therefore relates to the N streams of cells supplied to the N output modules, as if the N equivalent multicast cells were sent from N queues relating to those N output modules. At the level of an input module, each of the N equivalent multicast cells can be termed a virtual multicast cell whose departure time is controlled in the queue relating to the corresponding destination output module.

The instant of the service time that triggers the transfer of a multicast cell, referred to as the multicast service time, is then deemed to be the one that simultaneously triggers the transfer of the N virtual unicast cells into the N queues relating to the N destination output modules of the multicast cell. The multicast service time is controlled on the basis of a queue selected from those N queues and for which the service time of the virtual departure of the corresponding virtual unicast cell is in fact the multicast service time for the real departure of the multicast cell. For the other N−1 queues concerned, relating to the N−1 respective other destination output modules to which the multicast cell relates, the service time of the virtual departure of each of the N−1 other virtual unicast cells concerned is treated as a virtual service time, which is merely simulated at the same time as said multicast service time.

In each queue, relating to a given output module, the service time is controlled for all the cells which are to be sent to the corresponding output module, i.e. the set of all real and virtual unicast cells, so that the respective service times of the successive cells of the set of unicast cells are separated by a time interval that is at least equal to the service time interval required between two successive cells of the outgoing stream of cells supplied by the switching network to the output module concerned.

For each stream of outgoing cells supplied to an output module corresponding to a given queue, this guarantees that the predetermined cell bit rate which is allocated as a cell service bit rate in the queue concerned will not be exceeded.

In one embodiment of the invention, to control the service time of a multicast cell in an input module, the selected queue from which the multicast service time triggers the transfer of a multicast cell is chosen as the queue allocated the lowest predetermined service bit rate from the various service bit rates allocated to the N queues relating to the N destination output modules of that multicast cell, i.e. a queue for which the service time interval required between two successive cells of the set of unicast cells is the longest.

In the selected queue, the multicast service time used to trigger the actual transfer of the multicast cell naturally complies with the required condition that the departure times of two successive cells be separated by a minimum time interval at least equal to the service time interval required for the outgoing stream of cells supplied to the output module corresponding to the selected queue.

In one embodiment of the invention, for this required condition also to be satisfied for the N−1 other queues concerned, corresponding to the N−1 other destination output modules of the multicast cell, so that each predetermined cell bit rate allocated to one of the queues relating to an output module is not exceeded for the outgoing stream of cells supplied to that output module, the respective service times of the cells of said set of unicast cells are controlled, in each of the N−1 queues concerned relating to the N−1 respective other destination output modules concerned, by delaying relative to said virtual service time in the queue concerned the service time of the cells close to the instant of this virtual service time, so that for each of the N−1 queues concerned a minimum temporal distance is maintained, firstly, between the virtual service time and the service time of the cell that precedes it and, secondly, between the same virtual service time and the service time of the cell that follows it, that minimum temporal distance being equal to said service time interval required between two successive cells of the outgoing stream of cells supplied by the switching network to the destination output module corresponding to the queue concerned.

Accordingly, in each of the N−1 queues concerned, simulating the virtual service time of a virtual unicast cell at the same time as the multicast service time as controlled in the selected queue to trigger the real departure of a corresponding multicast cell takes account of the presence of that virtual unicast cell in the stream of outgoing cells supplied to the corresponding output module. To this end, a time-delay is applied to the cells near the instant of this virtual service time so that, for the cell preceding that instant and for the cell following that instant, their respective service time is effected, relative to that instant, at a temporal distance at least equal to the service time interval required between two successive cells for the outgoing stream of cells supplied to the output module corresponding to the selected queue.

In one embodiment, the choice of said selected queue used to trigger the transfer of a multicast cell and the constraints imposed on the service times of the cells close to the virtual service time in the N−1 other queues concerned, to maintain a time interval at least equal to the service time interval required between two successive cells from said set of unicast cells addressed to the corresponding output module, are predetermined at the service time of the selected queue which immediately precedes the multicast service time.

In one embodiment, in each of the N−1 queues concerned relating to the N−1 respective other destination output modules concerned, in order to delay the service times of the cells of said set of unicast cells addressed to the output module relative to said virtual service time in the queue concerned, the position of the service time that is closest to and precedes that of the virtual service time is first identified, and the offset from the identified service time to a subsequent temporal position situated after the virtual service time and at a minimum temporal distance from the latter at least equal to said service time interval required is then determined, by applying to the identified service time a time-delay equal to the temporal distance between the instant of the virtual service time increased by at least the service time interval required for the queue concerned.

The invention also provides an input module using the methods defined hereinabove.

BRIEF DESCRIPTION OF THE DRAWINGS

Other features and advantages of the invention will become apparent from the following description of embodiments of the invention, which is given with reference to the accompanying drawings, in which.

MORE DETAILED DESCRIPTION

The following abbreviations are used in the remainder of the description:

| | |
|---|---|
| GOCR: | granted output cell rate, |
| ITM: | input termination module, |
| MC: | multicast cell, |
| OTM: | output termination module, |
| Q: | queue, |
| SDT: | scheduled departure time, |
| STI: | service time interval, |
| UC: | unicast cell, |
| VUC: | virtual unicast cell. |

The following subscripts are generally used:

The subscript i designates any input module, e.g. $ITM_i$,

The subscript j designates any output module, e.g. $OTM_j$,

The subscript d designates a considered or given output module, e.g. $OTM_d$, and The subscript c designates a concerned output module, e.g. $OTM_c$.

Firstly, the theory of an asynchronous switching node in a telecommunications system and the associated problems are briefly described.

Figure 1:
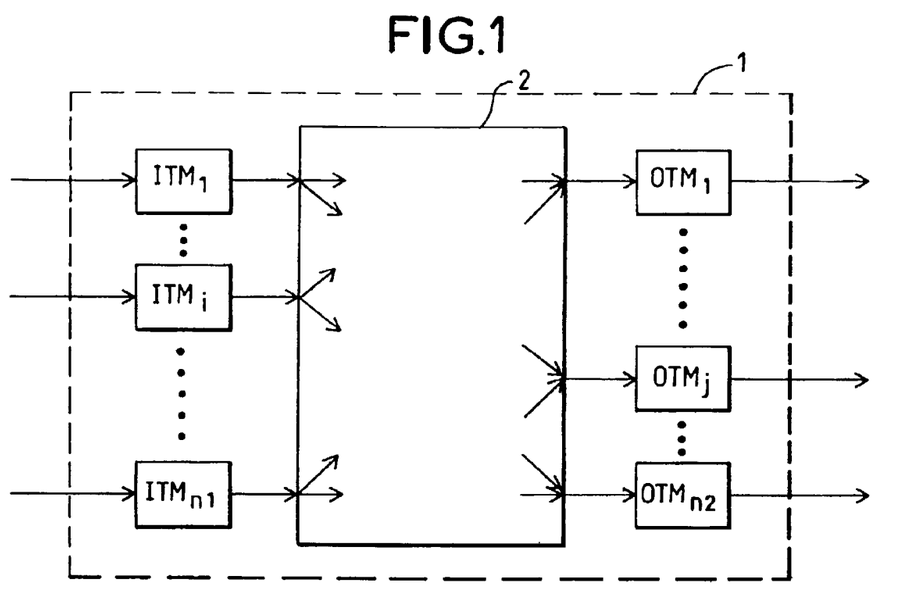
FIG. 1 is a theoretical diagram of a switching node for implementing a control method according to the invention.

As shown in FIG. 1, an asynchronous switching node 1 in a telecommunications system includes n1 input modules $ITM_1, \ldots, ITM_i, \ldots, ITM_{n1}$ which are conventionally connected to n2 output modules $OTM_1, \ldots, ITM_j, \ldots, OTM_{n2}$ by an asynchronous switching network 2. This separate representation of n1 input modules and n2 output modules can correspond either to physically separate input and output modules or to logical separation of the input and output functions in combined terminal modules providing both types of function, in which case the numbers n1 and n2 of modules are generally equal.

The switching node transfers a data block received by any input module $ITM_i$ to any one or more output modules $OTM_j$ via its switching network 2 in accordance with any internal routing mode, for example a connection oriented or connectionless routing mode.

An external data block received at an incoming port of an input module must be switched either to an outgoing port of a given output module, in which case it is called a unicast data block, or to outgoing ports of a plurality of output modules, in which case it is called a multicast data block.

In the prior art, external data blocks received in the form of variable length packets are converted into internal format cells in the input modules, typically by a process of packet segmentation. Once transferred to the destination output modules via the switching network, the internal format cells are converted back into external data blocks, cells or packets, typically by a process of cell reassembly in the case of external data blocks to be sent in the form of variable length packets. Within the switching node, the asynchronous switching network considered switches internal format cells, regardless of the external data block type, and each cell is transferred from an input module to at least one destination output module.

Two types of cell to be transferred via the cell switching network 2 therefore have to be considered in the input modules of the node: a first type of cell, called a unicast cell UC, must be routed to a single given destination output module, and a second type of cell, called a multicast cell MC, must be routed to N given destination output modules from the n2 output modules of the node (1<N≦n2).

There are two prior art methods of converting a multicast cell into N cells to be supplied to the N respective destination output modules: the first method generates N copies of a multicast cell in the input module, so that the latter in fact sends to the switching network N multicast cell each of which is to be sent to one of the N destination output modules required for that multicast cell. In the second method, which is used here, the input module sends the switching network a single example of the multicast cell MC, and the switching network is able, using a technique known in the art, to generate N copied cells $Uc_a, \ldots, Uc_n$ from a multicast cell and to route each of the N copied cells to the N respective destination output modules required for that multicast cell.

Figure 2:
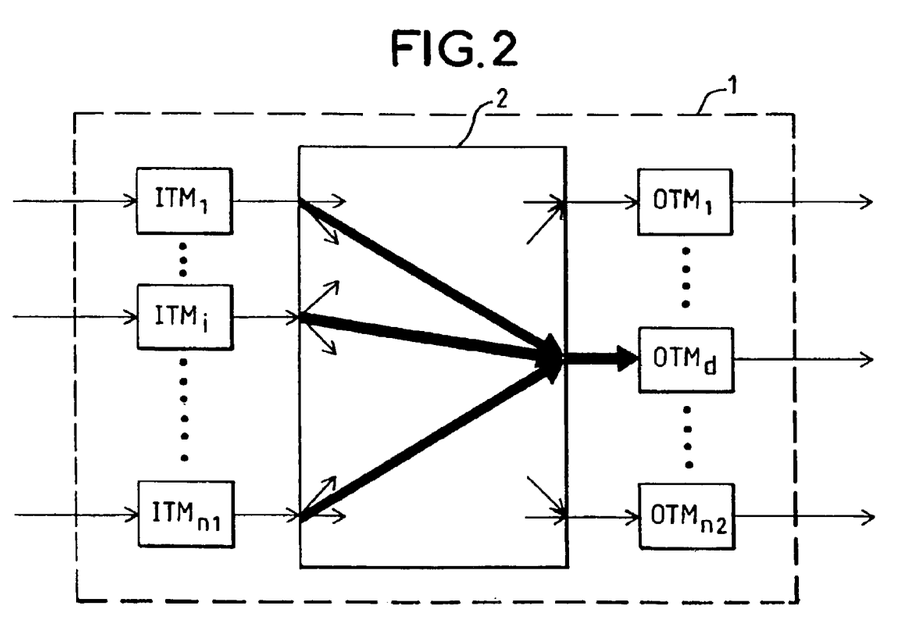
FIG. 2 is a diagram showing outgoing streams of cells supplied to a given output module from different input modules in the switching node shown in FIG. 1.

FIG. 2 shows outgoing streams of cells supplied to a given output module $OTM_d$ from input modules $ITM_1$, $ITM_{n1}$ in the switching node 1. There is a risk of the streams of cells transferred via the switching network creating congestion in the network whenever the overall bit rate of the traffic of cells supplied to an output module, such as the module $OTM_d$, becomes excessive in relation the authorized bandwidth for access to the output module, given that the capacity to transfer cells via the switching network is physically limited by characteristics specific to the network.

A conventional way to avoid congestion in the switching network is for each input module to regulate the bit rates at which cells are transferred to each output module of the node so that the overall bit rate of the traffic of cells supplied to each output module is not excessive.

Figure 3:
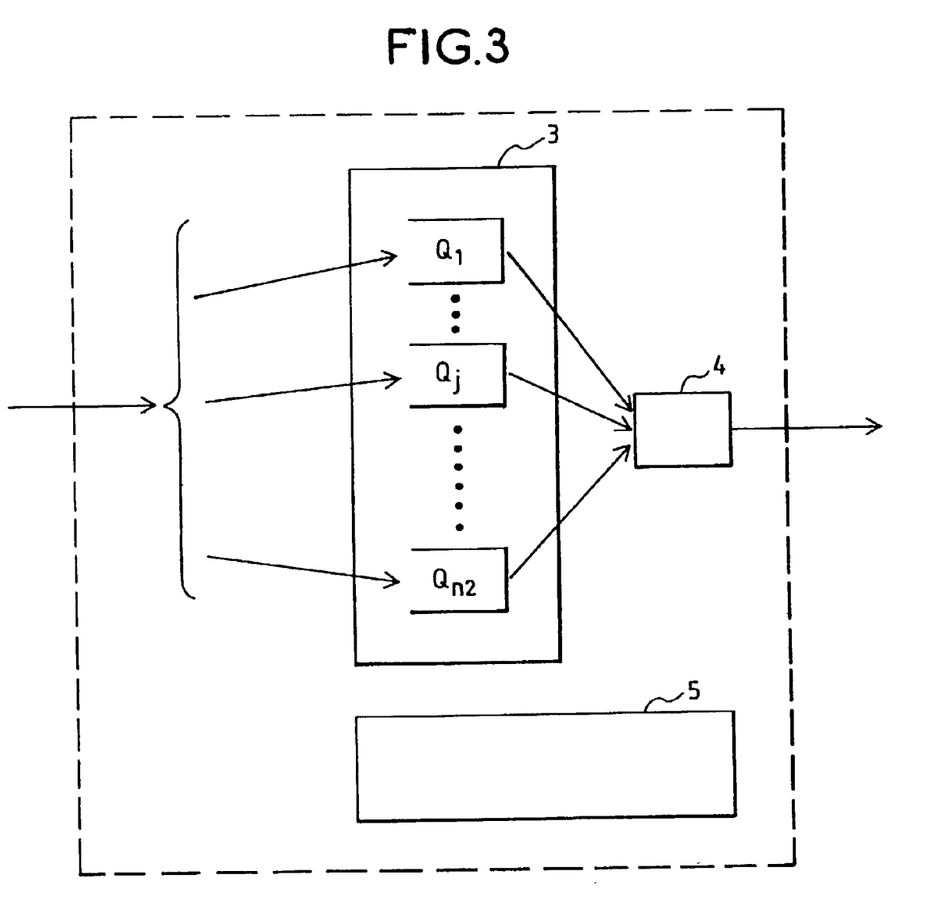
FIG. 3 is a theoretical diagram of an input module of a switching node as shown in FIGS. 1 and 2, FIGS. 4a and 4b are two diagrams used to explain the processing of a multicast cell, FIG. 4a showing its actual routing across the switching network and FIG. 4b representing the N corresponding virtual unicast cells considered by the method according to the invention in order to control the service times in an input module.

To this end, using a technique known in the art, and as shown in FIG. 3, each input module is provided with buffer memories 3 for storing cells temporarily and the buffer memories are structured in the form of a plurality of queues $Q_1, \ldots, Q_i, \ldots, Q_{n2}$ that are respectively managed for each outgoing stream of cells corresponding to the subset of cells supplied by the switching network to a given output module.

Using the above technique in an input module $ITM_i$, after processing by input interface and internal cell conversion functions known in the art (and not shown in FIG. 3), the cells are distributed to the queues $Q_1, \ldots, Q_j, \ldots, Q_{n2}$ as a function of their destination output module $OTM_1, \ldots, OTM_j, \ldots, OTM_{n2}$. To extract a cell from a queue and send it to the switching network, a queue multiserver 4 uses one of its service cycles to read the corresponding data in the queue and extract it therefrom. A queue multiserver distributes its service cycles to the queues proportionately to the cell service bit rate $GOCR_j$ allocated to each queue $Q_j$ for transferring the data blocks to be sent to the corresponding output module $OTM_j$. All the queues of an input module are controlled by a queue manager unit 5 assigned to that input module, as shown diagrammatically in FIG. 3.

The composition of the output modules of the node 1 is not shown in detail here because each output module can be of conventional design with a plurality of registers or memories to receive the data blocks, convert them into internal cells and then transmit those cells to the output interface functions of the input module.

The control functions required by the switching node 1 can be of any type known in the art. The control functions are therefore not shown in the figures, except for the queue manager unit 5 of an input module, shown in FIG. 3, which includes a portion of the characteristic means used to implement the service time control method according to the invention, here considered to constitute a dedicated control mechanism specific to the input modules of the node 1. The queue manager unit 5 is provided with appropriate hardware resources, including processors and memories, and appropriate software resources, in particular, for implementing the control method according to the invention (which is described in more detail later).

The technique known in the art based on the use in the input modules of queues for each output module is suitable for regulating the traffic bit rate of unicast cells addressed only to a single output module. In a queue $Q_d$ relating to a given destination output module $OTM_d$, the service time SDT of a unicast cell UC, which triggers its transfer from the input module to the output module via the switching network, is commanded at an instant determined as a function of the cell service bit rate $GOCR_d$ allocated to that queue, which can be predetermined so that all of the queues $Q_d$ in the input modules $ITM_1, \ldots, ITM_i, \ldots, ITM_{n1}$ relating to the same output module $OTM_d$ generate an overall traffic bit rate of cells supplied to the output module that is not excessive.

However, the above technique is not designed to regulate the bit rate of traffic of multicast cells, since it provides a structure of respective managed queues $Q_1, \ldots, Q_{n2}$ for each stream of outgoing cells including unicast cells supplied by the switching network to an output module $OTM_1, \ldots, OTM_{n2}$, whereas each multicast cell is itself addressed to N destination output modules.

Figure 4A:
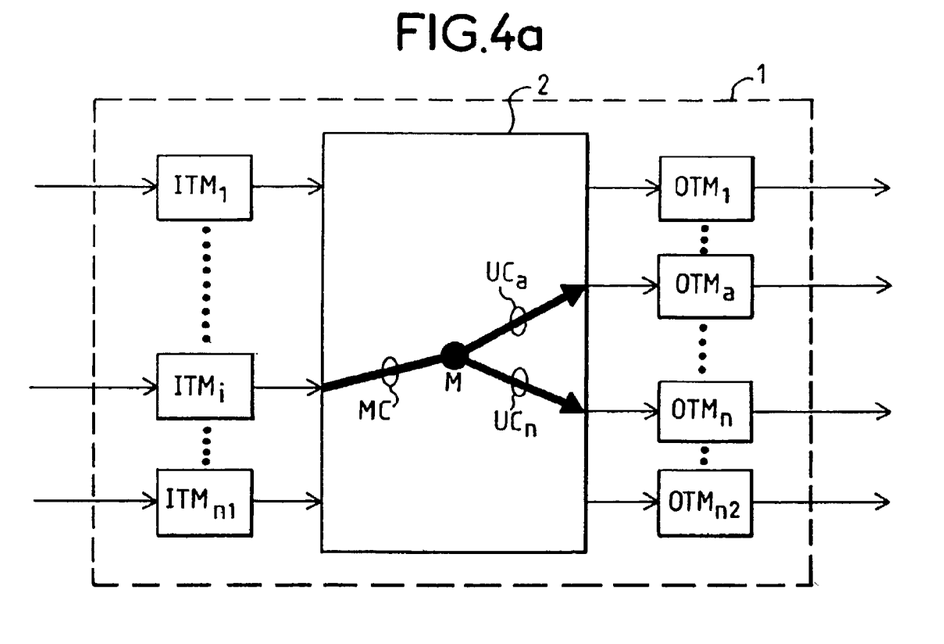

FIG. 4a shows the actual routing of a multicast cell sent by an input module $ITM_1$ to the switching network 2. Using a technique known in the art, symbolized by the point M in the figure, the network itself generates N unicast cells $UC_a, \ldots, UC_n$ from a multicast cell $MC_{a \ldots n}$ and supplies them to N respective destination output modules $OTM_a, \ldots, OTM_n$ required for the multicast cell. Accordingly, any multicast cell $MC_{a \ldots n}$ is transferred to the switching network as a single example of a cell, whereas the switching network supplies to the destination output modules $OTM_a, \ldots, OTM_n$ N unicast cells $UC_a, \ldots, UC_n$ equivalent to the multicast cell $MC_{a \ldots n}$ and which are part of the outgoing streams of cells supplied to the output modules on the same terms as the unicast cells sent directly by the input modules.

Given that each multicast cell sent to the switching network by an input module generates within the network N cells supplied to the N destination output modules, the service bit rate of those cells should be regulated to take account of their respective contribution to each overall traffic bit rate of cells supplied to the N respective output modules, so that none of the overall bit rates is excessive. In theory, generalizing this principle to multicast cells would necessitate introducing a new dimension corresponding to the number of different subsets of N destination output modules of the n2 output modules of the node. This would rapidly lead to excessive complexity once the number n2 of output modules were no longer small, as it would then imply a large number of combinations of subsets of N from n2 modules.

The problem is therefore being able to command, in each input module $ITM_1$, the service time of the various unicast cells UC and multicast cells, which triggers their departure from the queues $Q_j$ relating to an output module $OTM_j$, so that the overall traffic bit rate of cells supplied to each output module $OTM_j$ is not excessive.

To eliminate this disadvantage relating to the regulation of multicast cell bit rates, whilst ensuring that the overall traffic bit rate of all the cells supplied to each output module is not excessive, the invention uses, in the input cells of the asynchronous switching node, a method and a system for controlling the service time of the unicast cells and that of the multicast cells in queues relating to each of the outgoing streams of cells corresponding to the subset of cells supplied by the switching network to each given output module.

Figure 4B:
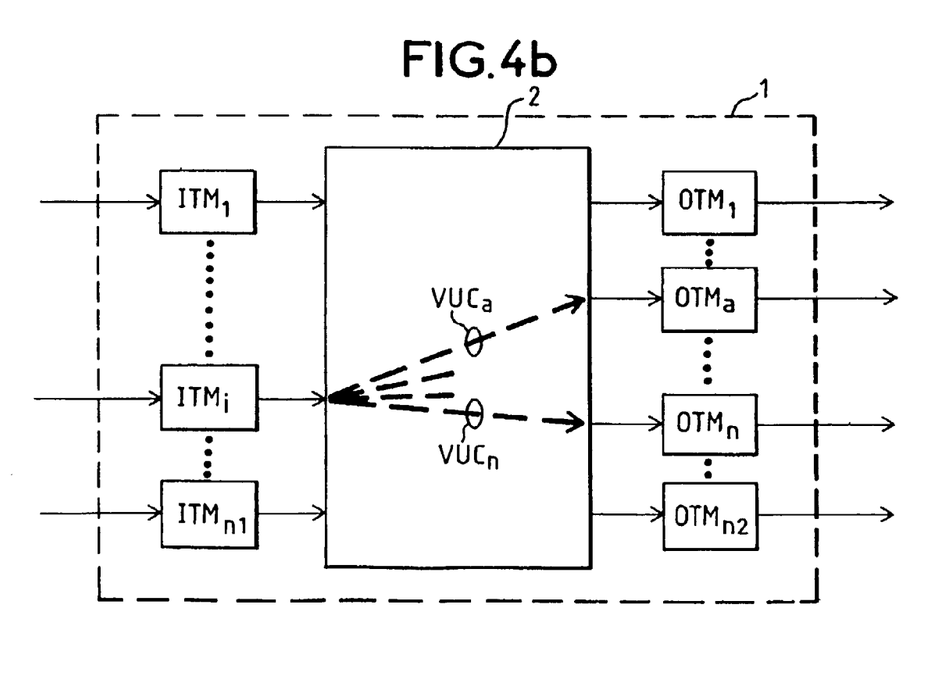

According to the invention, and to this end, in the queue manager 5 of an input module, the departure of a multicast cell MC is treated as the simultaneous departure of N virtual unicast cells $VUC_a, \ldots, VUC_n$, as shown in dashed line in FIG. 4b, each addressed to one of the N destination output modules $OTM_a, \ldots, OTM_n$ of that cell. The N virtual unicast cells respectively correspond to the N unicast cells $UC_a, \ldots, UC_n$ shown in FIG. 4a, which are supplied by the switching network to the output modules.

Also, to control the service time of the multicast cell MC, referred to herein as the multicast service time $SDT_m$, by the control method of the invention, a selected queue $Q_m$ that triggers its transfer into the switching network is chosen from the N queues $Q_a, \ldots, Q_n$ relating to the N destination output modules. For the selected queue $Q_m$, the service time of the virtual destination cell $VUC_m$ therefore corresponds to the multicast service time $SDT_m$. For each of the other N−1 queues $Q_c$ concerned, the virtual service time $SDT_{c/v}$ of the virtual unicast cell $VUC_c$ is merely simulated, i.e. taken into account but without extracting a cell from the queue, at the same instant as the multicast service time $SDT_m$.

Finally, in each input module, for commanding the departure of unicast cells $UC_j$ and multicast cells $MC_{j/N}$ in each queue $Q_j$ relating to an output module $OTM_j$, the successive service times $SDT_j$ of that queue are allocated to all of the cells with which the output module is concerned, referred to herein as a set of unicast cells $[UC_j; VUC_j]$, and which comprises the real unicast cells $UC_j$ and the virtual unicast cells $VUC_j$ corresponding to multicast cells $MC_j/N$ having the output module $OTM_j$ in the N respective destination output modules. The respective service times of these cells are then separated by a time interval that it as least equal to the service time interval $STI_j$ required between two successive cells of the outgoing stream of cells supplied by the switching network to the output module.

Accordingly, for each outgoing stream of cells supplied to a given output module $OTM_j$, the successive cells received by the output module from a given input module $ITM_i$ have been transferred with respective starting times separated by at least the service time interval $STI_j$ that is inversely proportional to the predetermined cell service bit rate $GOCR_j$ allocated to the corresponding queue $Q_j$. This guarantees that the overall traffic of cells received by each output module $OTM_j$ from the input modules $ITM_1, \ldots, ITM_{n1}$ is not excessive for all of the unicast and multicast cell traffic of the switching node.

According to a preferred feature of the invention, the selected queue $Q_m$, from which the multicast service time $SDT_m$ triggers the transfer of a multicast cell MC, is chosen as being a queue allocated the lowest predetermined service bit rate $GOCR_m$ of the various service bit rates $GOCR_a, \ldots, GOCR_n$ allocated to the N queues $Q_a, \ldots, Q_n$ that relate to the N destination output modules $OTM_a, \ldots, OTM_n$ of that multicast cell.

This simplifies implementation of the service time control method, in that this selection criterion guarantees that, for each of the N−1 other queues concerned relating to the N−1 respective other destination output modules $OTM_c$ concerned, the service time interval $STI_c$ required between two successive cells of the set of unicast cells $[UC_c; VUC_c]$ is no greater than the service time interval $STI_m$ required by the selected queue $Q_m$.

According to another feature of the invention, in each of the N−1 queues $Q_c$ concerned, the respective service times of the cells of said set of unicast cells $[UC_c; VUC_c]$ are controlled by delaying the service time of cells close to the instant of the virtual service time $SDT_{c/v}$ relative to the virtual service time $SDT_{c/v}$ introduced into the queue $Q_c$ concerned. To this end, the offsetting of these close cells is applied in each of the N−1 queues $Q_c$ concerned in order to maintain a minimum time distance between, firstly, the virtual service time $SDT_{c/v}$ and the service time $SDT_{c/p}$ of the cell that precedes it and, secondly, between the same virtual service time $SDT_{c/v}$ and the service time $SDT_{c/f}$ of the cell that follows it, this minimum time distance being equal to said service time interval $STI_c$ required between two successive cells of the set of unicast cells $[UC_c; VUC_c]$ that corresponds to the outgoing stream of cells supplied by the switching network to the destination output module $OTM_c$ relating to the queue $Q_c$ concerned.

Accordingly, by applying a time-delay of this kind in each of the N−1 queues $Q_c$ concerned to those cells that are close to the instant of the virtual service time $SDT_{c/v}$, introduced for the purpose of simulating the virtual departure of the virtual unicast cell $VUC_c$, it is guaranteed that the service time $SDT_{c/p}$ of the cell that precedes the virtual service time $SDT_{c/v}$ of the virtual unicast cell $VUC_c$ and the service time $SDT_{c/f}$ of the cell that follows it are positioned at instants situated at a temporal distance at least equal to the service time interval $STI_c$ required for the queue $Q_c$, which ensures that the predetermined cell service bit rate $GOCR_c$ allocated to the queue $Q_c$, and thus the bit rate of the outgoing stream of cells supplied to the corresponding output module $OTM_c$, is not exceeded.

In a preferred embodiment of the invention, the choice of the selected queue $Q_m$ used to trigger the actual departure of multicast cell MC and as the constraints imposed on the service times of the cells close to the virtual service time $SDT_{c/v}$ in the N−1 other queues $Q_c$ concerned, in order to maintain a time interval at least equal to the service time interval $STI_c$ required between two successive cells of said set of unicast cells $[UC_c, \ldots, VUC_c]$, are predetermined during the service time $SDT_{m'}$ of the selected queue $Q_m$ that immediately precedes the multicast service time $SDT_m$.

If, in this preferred embodiment, the selected queue $Q_m$ is chosen on the basis of the characteristic mentioned above, so that this queue is that allocated the lowest predetermined service bit rate $GOCR_m$ of the various service bit rates allocated to the N queues $Q_a, \ldots, Q_n$ that relate to the N destination output modules of the multicast cell, there can further be provision for delaying the service times of the cells close to the virtual service time $SDT_{c/v}$ in the N−1 other queues $Q_c$ concerned, firstly to identify the position of the service time $SDT_k$ closest to and preceding the virtual service time $SDT_{c/v}$ and then to command the offsetting of this identified service time to a later temporal position $SDT_k$ after the virtual service time $SDT_{c/v}$ and at a minimum temporal distance therefrom at least equal to said service time interval $STI_c$ required between two successive cells of said set of unicast cells $[UC_c, \ldots, VUC_c]$ for the queue $Q_c$ concerned.

Figure 5A:
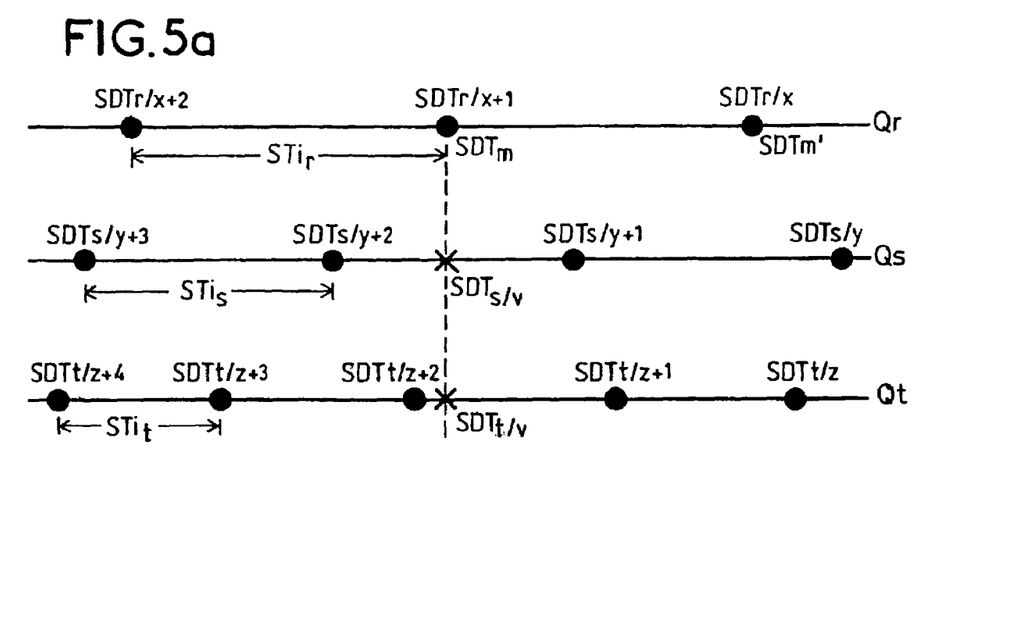
FIGS. 5a, 5b, 6a and 6b are diagrams to show how a preferred embodiment of the method according to the invention functions.
Figure 5B:
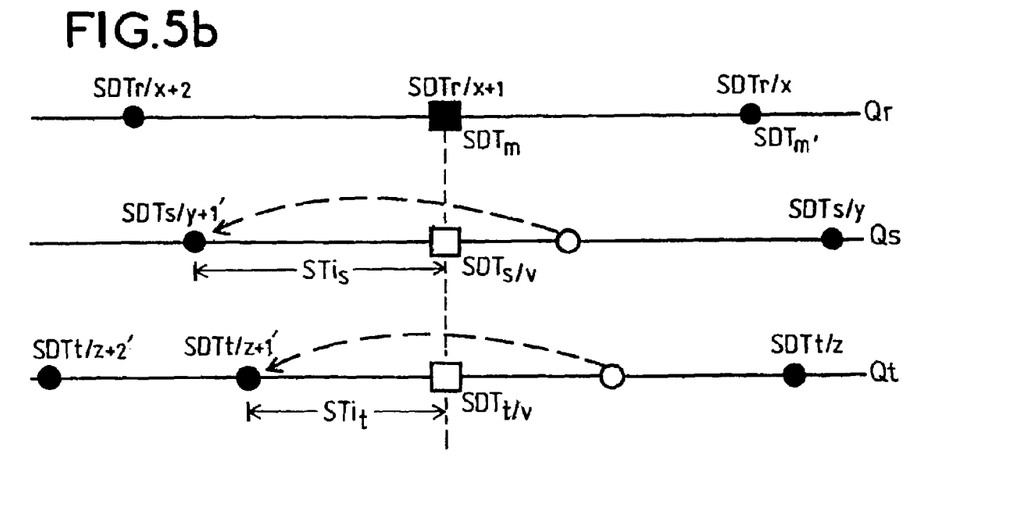
Figure 6A:
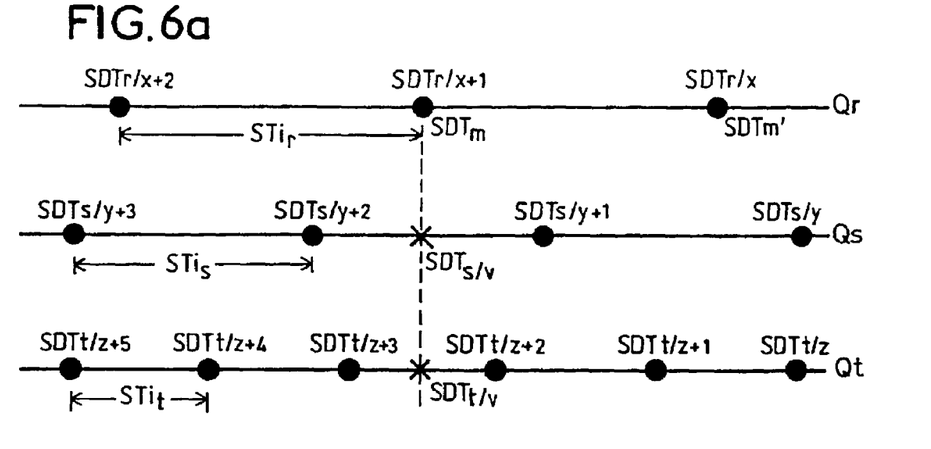
Figure 6B:
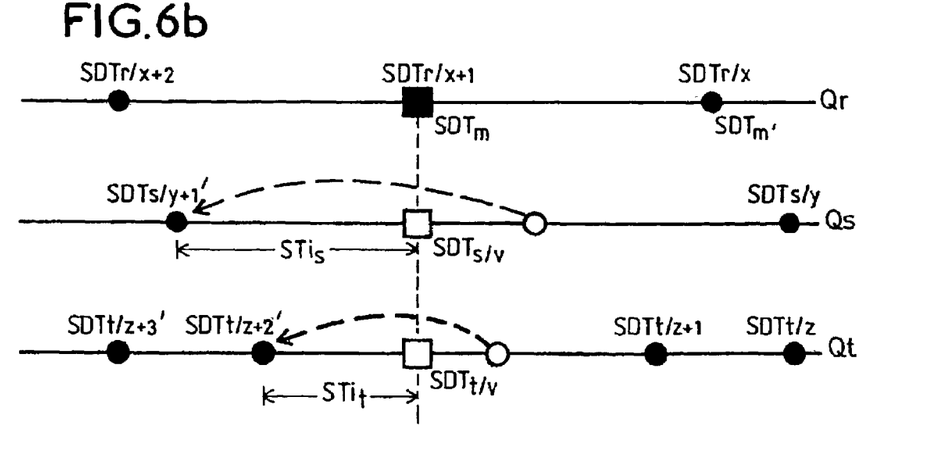

An embodiment of the above kind is described with the aid of FIGS. 5 and 6, which show an example of controlling service times in an input module in the case of a multicast cell $MC_{rst}$ addressed to three (N=3) destination output modules $OTM_r$, $OTM_s$, $OTM_t$.

In the diagrams in these figures, the sequence of successive service times of each of the three queues $Q_r$, $Q_c$ and $Q_t$ relating to the respective output modules $SDT_r$, $SDT_s$, $SDT_t$ is indicated on respective time lines in which time flows from right to left.

In FIG. 5a, a black circle indicates the a priori position of the successive service times of each of the three queues, i.e. in the absence of multicast cells. In this case, the position of the successive service times for each of the queues $Q_r$, $Q_s$, $Q_t$ is determined periodically, by a respective service time interval $STI_r$, $STI_s$, $STI_t$. For example, for the queue $Q_r$, the three successive service times $SDT_{r/x}$, $SDT_{r/x+1}$, and $SDT_{r/x+2}$ represented in FIG. 5a are separated by the required service time interval $STI_r$ between the departures of two successive cells. The service time intervals $STI_r$, $STI_s$, $STI_t$ are inversely proportional to the respective cell service bit rates $GOCR_r$, $GOCR_s$, $GOCR_t$ allocated to the queues. The example shown in FIGS. 5 and 6 also presupposes that the three cell service bit rates allocated to these queues are such that $GOCR_r < GOCR_s < GOCR_t$, which leads to the situation $STI_r > STI_s > STI_t$, as can be seen in FIG. 5a.

Let us assume that the requirement to transmit a multicast cell $MC_{rst}$ arises at a time situated in the left-hand portion of the diagram. A selected queue $Q_m$ is then chosen to transmit the cell $MC_{rst}$; the queue $Q_r$ is therefore selected as that allocated the lowest cell service bit rate $GOCR_r$ (so that in this example $Q_m = Q_r$.) This choice is made during the service time $SDT_{m'}$, that precedes the multicast service time $SDT_m$; the example shown in FIG. 5a presupposes that the choice is made in the service time $SDT_{r/x}$ (so that in this example $SDT_{m'} = SDT_{r/x}$), and the multicast service time $SDT_m$ is therefore situated at the next service time $SDT_{r/x}+1$ (so that in this example $SDT_m = SDT_{r/x}+1$). Furthermore, at the same time as the multicast service time $SDT_{r/x+1}$ predetermined for the queue $Q_r$, as indicated in the figure by the vertical dashed line, a respective virtual service time $SDT_{s/v}$ and $SDT_{t/v}$ for taking account of the virtual departure of a virtual unicast cell at that time is introduced into the sequence of service times of each of the two (N−1=2) queues concerned $Q_s$ and $Q_t$. These virtual service times are symbolized by a cross in FIG. 5a.

At this stage, as can be seen in FIG. 5a, the introduction at this instant of a respective virtual service time $SDT_{s/v}$ and $SDT_{t/v}$ into the normal sequence of service times of each of the queues concerned $Q_s$ and $Q_t$ would have the effect of no longer maintaining the required service time intervals $STI_s$ and $STI_t$ between two successive cells of said set of unicast cells [$UC_s$; $VUC_s$] and [$UC_t$; $VUC_t$], respectively, since these service time intervals $STI_s$ and $STI_t$ are not greater than the service time interval $STI_r$.

To re-establish this condition for the queues concerned $Q_s$ and $Q_t$ at the service time $SDT_{r/x}$ preceding the multicast service time $SDT_{r/x}+1$, the time-delays to be applied to the service times close to the virtual service times $SDT_{s/v}$ and $SDT_{t/v}$ introduced are predetermined. To this end, for each queue concerned $Q_s$ and $Q_t$ there is first identified in its service time sequence the position of the service time that is closest to and precedes that of the respective virtual service time $SDT_{s/v}$ and $SDT_{t/v}$, that is to say the respective service times $SDT_{s/y}+1$ and $SDT_{t/z}+1$ in the example shown in FIG. 5a (so that in this example $SDT_{c/k} = SDT_{s/y}+1$ for the queue $Q_s$ and $SDT_{t/z}+1$ for the queue $Q_t$).

FIG. 5b shows the same example as FIG. 5a, but further shows the impact of introducing the multicast cell $MC_{rst}$. In this figure, the multicast service time $SDT_{r/x+1}$ is highlighted by a black square, the corresponding virtual service times $SDT_{s/v}$ and $SDT_{t/v}$ by a white square, and the identified service times $SDT_{s/y+1}$ and $SDT_{t/z+1}$ by white circles.

There is then determined the offset of each identified service time at a later time position situated after the virtual service time $SDT_{s/v}$ and $SDT_{t/v}$ and at a minimum temporal distance there from equal to the respective required service time interval $STI_s$ and $STI_t$ between two successive cells of said set of unicast cells. Accordingly, as shown in FIG. 5b, the identified service times $SDT_{s/y+1}$ and $SDT_{t/z+1}$ are respectively shifted to the new service time positions $SDT_{s/y+1'}$ and $SDT_{t/z+1'}$ beyond the virtual service time positions $SDT_{s/v}$ and $SDT_{t/v}$ at a distance equal to the respective required service time interval $STI_s$ and $STI_t$ (so that in this example $SDT_{c/k'} = SDT_{s/y+1'}$ for the queue $Q_s$ and $SDT_{t/z+1'}$ for the queue $Q_t$). Consequently, applying this kind of service time offset in the service time sequence of each of the queues concerned also shifts the position of later service times in the sequence by the same amount.

Note that it is equally feasible to offset the identified service times $SDT_{s/y+1}$ and $SDT_{t/z+1}$ to other positions situated beyond the virtual service times at a distance greater than the required service time interval, for example such as $SDT_{s/y+3}$ and $SDT_{t/z+3}$, respectively (FIG. 5a), but it is preferable to choose the times $SDT_{s/x+1'}$ and $SDT_{t/x+1'}$ because this minimizes the resulting cell bit rate reduction.

The FIGS. 6a and 6b diagrams are analogous to those of FIGS. 5a and 5b; as in FIGS. 5a and 5b, the queue $Q_r$ is selected and the multicast cell departs at the service time $SDT_{r/x+1}$. The diagrams differ in that here an even greater cell service bit rate is allocated to one of the queues concerned, this greater bit rate being such that, in its service time sequence, there are several service times in the time interval between the multicast service time $SDT_m$ and the service time $SDT_{m'}$ that precedes it. In the example shown in FIG. 6a, the service time sequence of the queue $Q_t$ has two service times $SDT_{t/z+1}$ and $SDT_{t/z+2}$ in the time interval between the multicast service time ($SDT_m = SDT_{r/x+1}$) and the preceding service time ($SDT_{m'} = SDT_{r/x}$). in this kind of situation, as shown in FIG. 6b, only the service time closest to and preceding the virtual service time $SDT_{t/v}$, namely the service time $SDT_{t/z+2}$, must be shifted beyond $SDT_{t/v}$ as previously, and any other earlier service time, such as the service time $SDT_{t/z+1}$, can be utilized in the normal manner.

What is claimed is:

1. A method of controlling service time of unicast cells (UC) and multicast cell (MC) in input modules of an asynchronous switching node which comprises n1 input modules ($ITM_1, \ldots, ITM_i, \ldots, ITM_{n1}$) and n2 output modules ($OTM_1, \ldots, OTM_i, \ldots, OTM_{n1}$) interconnected by a cell switching network that transfers each cell from an input module to at least one output module, a unicast cell (UC) being routed to a single given destination output module ($OTM_d$) and a multicast cell (MC) being routed to N given destination output modules ($OTM_a, \ldots, OTM_n$) of the n2 output modules of the node via said switching network which itself generates N cells ($UC_a, \ldots, UC_n$) copied from a multicast cell, each input module being provided with buffer memories for temporarily storing cells, the service time of a cell (UC; MC) in a buffer memory triggering its transfer from the input module to at least one output module via the switching network, and the service times of all of the unicast and multicast cells (UC; MC) being controlled in each input module in queues ($Q_1, \ldots, Q_j, \ldots, Q_{n2}$) relative to each output module ($OTM_1, \ldots, OTM_j, \ldots, OTM_{n2}$), which method is characterized in that:
the service time of a multicast cell (MC) is controlled in a manner that takes account of the fact that the switching network itself generates, from each multicast cell to be transferred to N destination output modules ($OTM_a, \ldots, OTM_n$), N copied cells ($UC_a, \ldots, UC_n$) that it delivers to the N respective output modules, considering, in each input module ($ITM_i$), the departure of a multicast cell (MC) to the switching network as being equivalent to the simultaneous departure of N virtual unicast cells ($VUC_a, \ldots, VUC_n$) to the N destination output modules ($OTM_a, \ldots, OTM_n$), the N virtual unicast cells ($VUC_a, \ldots, VUC_n$) corresponding to the N cells ($UC_a, \ldots, UC_n$) generated by the switching network and supplied to the output modules, the service time of the virtual departure of one of said N virtual unicast cells ($VUC_m$) corresponds to the service time, referred to as the multicast service time ($SDT_m$), of the real departure of that multicast cell from a selected queue ($Q_m$) relating to one of the N destination output modules ($OTM_m$), and the service time of the virtual departure of each of N−1 other virtual unicast cells concerned ($VUC_c$) is only simulated, in each of the N−1 queues concerned ($Q_c$) relating to the N−1 respective other destination output modules concerned ($OTM_c$), as a virtual service time ($SDT_{c/v}$) that is effected at the same instant as that of said multicast service time ($SDT_m$), and in that, in an input module ($ITM_j$), the service times of the unicast and multicast cells ($UC_j$; $MC_{j/N}$) are controlled in each queue ($Q_j$) relating to an output module ($OTM_j$) so that, for all of the cells relating to that output module, referred to as the set of unicast cells [$UC_j$; $VUC_j$], which comprises, firstly, the real unicast cells ($UC_j$) and, secondly, the virtual unicast cells ($VUC_j$) corresponding to multicast cells ($MC_{j/N}$) having this output module ($OTM_j$) from its N destination output modules, the respective service times of these cells being separated by a time interval at least equal to the service time interval ($STI_j$) required between two successive cells of the outgoing stream of cells supplied by the switching network to that output module, so that, for each outgoing stream of cells supplied to a given output module ($OTM_j$), the predetermined cell bit rate ($GOCR_j$) that is allocated to the corresponding queue ($Q_j$) is not exceeded.

2. A method according to claim 1, characterized in that, to control the service time of a multicast cell in an input module, the selected queue ($Q_m$) from which the multicast service time ($SDT_m$) triggers the transfer of a multicast cell (MC) is chosen as the queue allocated the lowest predetermined service bit rate ($GOCR_m$) from the various service bit rates ($GOCR_a$, ..., $GOCR_n$) allocated to the N queues ($Q_a$, ..., $Q_n$) relating to the N destination output modules ($OTM_a$, ..., $OTM_n$) of that multicast cell.

3. A method according to claim 1, characterized in that, so that each predetermined cell bit rate ($GOCR_j$) allocated to one of the queues ($Q_j$) relating to an output module ($OTM_j$) is not exceeded for the outgoing stream of cells supplied to that output module, the respective service times of the cells of said set of unicast cells [$UC_c$; $VUC_c$] are controlled, in each of the N−1 queues concerned ($Q_c$) relating to the N−1 respective other destination output modules concerned ($OTM_c$), by delaying relative to said virtual service time ($SDT_{c/v}$) in the queue concerned ($Q_c$) the service time of the cells close to the instant of this virtual service time ($SDT_{c/v}$), so that for each of the N−1 queues concerned ($Q_c$) a minimum temporal distance is maintained, firstly, between the virtual service time ($SDT_{c/v}$) and the service time of the cell that precedes it ($SDT_{c/p}$) and, secondly, between the same virtual service time ($SDT_{c/v}$) and the service time of the cell that follows it ($SDT_{c/f}$), that minimum temporal distance being equal to said service time interval ($STI_c$) required between two successive cells of the outgoing stream of cells supplied by the switching network to the destination output module ($OTM_c$) corresponding to the queue concerned ($Q_c$).

4. A method according to claim 1, characterized in that the choice of said selected queue ($Q_m$) used to trigger the transfer of a multicast cell (MC) and the constraints imposed on the service times of the cells close to the virtual service time ($SDT_{c/v}$) in the N−1 other queues concerned ($Q_c$), to maintain a time interval at least equal to the service time interval ($STI_c$) required between two successive cells from said set of unicast cells [$UC_c$, ..., $VUC_c$] addressed to the corresponding output module ($OTM_c$), are predetermined at the service time ($SDT_{m'}$) of the selected queue ($Q_m$) which immediately precedes the multicast service time ($SDT_m$).

5. A method according to claim 2, characterized in that, in each of the N−1 queues concerned ($Q_c$) relating to the N−1 respective other destination output modules concerned ($OTM_c$) in order to delay the service times of the cells of sid set of unicast cells [$UC_c$, ..., $VUC_c$] addressed to the output module ($OTM_c$) relative to said virtual service time ($SDT_{c/v}$) in the queue concerned ($Q_c$) the position of the service time ($SDT_k$) that is closest to and precedes that of the virtual service time ($SDT_{c/v}$) is first identified, and the offset from the identified service time to subsequent temporal postion ($SDT_{k'}$) situated after the virtual service time ($SDT_{c/v}$) and at a minimum temporal distance from the latter at least equal to said service time interval ($STI_c$) required is them determined, by applying to the identified service time a time-delay equal to the temporal distance between the instant of the virtual service time ($SDT_{c/v}$) increased by at least the service time interval ($STI_c$) required for the queue concerned ($Q_c$).

6. An input module in an asynchronous switching node comprising n1 input modules ($ITM_1$, ..., $ITM_i$, ..., $ITM_{n1}$) and n2 output modules ($OTM_1$, ..., $OTM_j$, ..., $OTM_{n1}$) interconnected by a cell switching network that transfers each cell from an input module to at least one output module, a unicast cell (UC) being routed to a single given destination output module ($OTM_d$) and a multicast cell (MC) being routed to N given destination output modules ($OTM_a$, ..., $OTM_n$) of the n2 output modules of the node via said switching network which itself generates N cells ($UC_a$, ..., $UC_n$) copied from a multicast cell, said input module being provided with buffer memories for temporarily storing cells and controlling the service time of each cell (UC; MC) in a buffer memory to trigger its transfer from the input module to at least one output module via said switching network, and the service times of all of the unicast and multicast cells (UC; MC) being controlled in each input module in queues ($Q_1$, ..., $Q_j$, ..., $Q_{n2}$) relating to each output module ($OTM_1$, ..., $OTM_j$, ..., $OTM_{n2}$), which module is characterized in that: the input module ($ITM_i$) includes means for controlling the service time of a multicast cell (MC) that take account of the fact that, for each multicast cell to be transferred to N destination output modules ($OTM_a$, ..., $OTM_n$), the switching network itself generates, from that cell, N copied cells ($UC_a$, ..., $UC_n$) that it delivers to the N respective output modules, considering, in each input module ($ITM_i$), the departure of a multicast cell (MC) to the switching network as being equivalent to the simultaneous departure of N virtual unicast cells ($VUC_a$, ..., $VUC_n$) addressed to those N destination output modules ($OTM_a$, ..., $OTM_n$), the N virtual unicast cells ($VUC_a$, ..., $VUC_n$) corresponding to the N cells ($UC_a$, ..., $UC_n$) generated by the switching network and supplied to the output modules so that, firstly, the service time of the virtual departure of one of the N virtual unicast cells ($VUC_m$) corresponds to the service time of the real departure of that multicast cell, referred to as the multicast service time ($SDT_m$), which is effected from a selected queue ($Q_m$) relating to one of the N destination output modules ($OTM_m$), and, secondly, the service time of the virtual departure of each of N−1 other virtual unicast cells concerned ($VUC_c$) in each of the N−1 queues concerned ($Q_c$) relating to the N−1 respective other destination output modules concerned ($OTM_c$), is only simulated as a virtual service time ($SDT_{c/v}$) which is effected at the same instant as that of said multicast service time ($SDT_m$), and said means, in an input module ($ITM_i$), control the service times of unicast and multicast cells ($UC_j$; $MC_{j/N}$) in each queue ($Q_j$) relating to an output module ($OTM_j$) so that, for all of the cells relating to that output module, referred to as a set of unicast cells [$UC_j$; $VUC_j$], which comprises, firstly, the real unicast cells ($UC_j$) and, secondly, the virtual unicast cells ($VUC_j$) corresponding to multicast cells ($MC_{j/N}$) having this output module ($OTM_j$) from the N destination output modules, the respective service times of these cells being separated by a time interval at least equal to the service time interval ($STI_j$) required between two successive cells of the outgoing stream of cells supplied by the switching network to the output module so that, for each outgoing stream of cells supplied to a given output module ($OTM_j$), the predetermined cell bit rate ($GOCR_j$) that is allocated to the corresponding queue ($Q_j$) is not exceeded.

7. An input module according to claim 6, characterized in that, to control the service time of a multicast cell in an input module, said means are adapted further to select said selected queue ($Q_m$) from which said multicast service time ($SDT_m$) triggers the transfer of a multicast cell (MC) as being a queue that has been allocated the lowest predetermined service bit rate ($GOCR_m$) of the service bit rates ($GOCR_a, \ldots, GOCR_n$) allocated to the N queues ($Q_a, Q_n$) relating to the N destination output modules ($OTM_a, \ldots, OTM_n$) of that multicast cell.

8. An input module according to claim 6, characterized in that, so as not to exceed each predetermined cell bit rate ($GOCR_j$) allocated to one of the queues ($Q_j$) relating to an output module ($OTM_j$), for the outgoing stream of cells supplied to that output module, said means are adapted further to control, in each of the N−1 queues concerned ($Q_c$) relating to the N−1 respective other destination output modules concerned ($OTM_c$), the respective service times of the cells of said set of unicast cells [$UC_c$; $VUC_c$] by delaying, relative to said virtual service time ($SDT_{c/v}$) in the queue concerned ($Q_c$), the service time of cells close to the instant of the virtual service time ($SDT_{c/v}$) so that, for each of the N−1 queues concerned ($Q_c$), a minimum temporal distance is maintained, firstly, between the virtual service time ($SDT_{c/v}$) and the service time ($SDT_{c/p}$) of the cell that precedes it and, secondly, between the same virtual service time ($SDT_{c/v}$) and the service time ($SDT_{c/f}$) of the cell that follows it, the minimum temporal distance being equal to said service time interval ($STI_c$) required between two successive cells of the outgoing stream of cells supplied by the switching network to the output module ($OTM_c$).

9. An input module according to claim 6, characterized in that it further includes means for predetermining, at the service time ($SDT_{m'}$) of the selected queue ($Q_m$), which immediately precedes the multicast service time ($SDT_m$), firstly, the selection of said selected queue ($Q_m$) used to trigger the transfer of a multicast cell (MC) and, secondly, constraints imposed on the service times of cells close to the virtual service time ($SDT_{c/v}$) in the N−1 other queues concerned ($Q_c$), in order to maintain a time interval at least equal to the service time interval ($STI_c$) required between two successive cells of said set of unicast cells [$UC_c, \ldots, VUC_c$] addressed to the corresponding output module ($OTM_c$).

10. An input module according to claim 7, characterized in that the means used in each of the N−1 queues concerned ($Q_c$) relating to the N−1 respective other destination output modules concerned ($OTM_c$) to delay the service times of said set of unicast cells [$UC_c, \ldots, VUC_c$] addresses to the output module ($OTM_c$) relative to said virtual time ($SDT_{c/v}$) in the queue concerned ($Q_c$) are adapted first of all to identify the position of the service time $SDT_k$) which is closest to and precedes that of this virtual service time ($SDT_{c/v}$) and then to determine the offset from this identified service time to a later temporal position ($SDT_{k'}$) situated after this virtual service time and a minimum temporal distance therefrom at least equal to said required service time interval $STI_c$), by applying to this identified service time a time-delay equal to the temporal distance between it and the instant of this virtual service time ($SDT_{c/v}$) increasedby at least the interval ($STI_c$) required for the queue concerned ($Q_c$).

* * * * *